United States Patent
Zhang et al.

(10) Patent No.: US 10,756,801 B2
(45) Date of Patent: Aug. 25, 2020

(54) METHOD AND APPARATUS FOR TRANSMITTING CHANNEL STATE INFORMATION

(71) Applicant: HUAWEI TECHNOLOGIES CO., LTD., Shenzhen, Guangdong (CN)

(72) Inventors: Di Zhang, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/360,446

(22) Filed: Mar. 21, 2019

(65) Prior Publication Data
US 2019/0222285 A1 Jul. 18, 2019

Related U.S. Application Data

(63) Continuation of application No. PCT/CN2016/100964, filed on Sep. 29, 2016.

(51) Int. Cl.
*H04B 7/02* (2018.01)
*H04B 7/06* (2006.01)
(Continued)

(52) U.S. Cl.
CPC ......... *H04B 7/0626* (2013.01); *H04B 7/0456* (2013.01); *H04B 7/0478* (2013.01);
(Continued)

(58) Field of Classification Search
CPC .. H04B 7/0626; H04B 7/0456; H04B 7/0478; H04B 7/066; H04L 25/0224; H04L 1/0028; H04L 25/03898; H04L 5/0048
(Continued)

(56) References Cited

U.S. PATENT DOCUMENTS

2008/0316935 A1* 12/2008 Bala ..................... H04B 7/0408
370/252
2010/0046659 A1 2/2010 Kim et al.
(Continued)

FOREIGN PATENT DOCUMENTS

CN 101615984 A 12/2009
CN 101682433 A 3/2010
(Continued)

OTHER PUBLICATIONS

Texas Instruments, "Performance of SU/MU MIMO Switching with Multi-Rank Implicit Feedback", 3GPP TSG RAN WG1 59bis R1-100455, Valencia, Spain, Jan. 18-22, 2010, total 4 pages.
(Continued)

*Primary Examiner* — Zewdu A Kassa
(74) *Attorney, Agent, or Firm* — Fish & Richardson P.C.

(57) ABSTRACT

The present disclosure provide a method and an apparatus for transmitting channel state information. A terminal device receives a reference signal from a network device, obtains a precoding matrix based on the reference signal. The terminal device determines first amplitude information and second amplitude information of the precoding matrix. The first amplitude information is used to indicate amplitude quantization information of a wideband, and the second amplitude information is used to indicate amplitude quantization information of N subbands of the wideband. The terminal device sends the first amplitude information and the second amplitude information to the network device.

16 Claims, 5 Drawing Sheets

(51) Int. Cl.
*H04B 7/0456* (2017.01)
*H04L 25/02* (2006.01)
*H04L 25/03* (2006.01)
*H04L 5/00* (2006.01)
*H04L 1/00* (2006.01)

(52) U.S. Cl.
CPC ......... *H04B 7/066* (2013.01); *H04L 25/0224* (2013.01); *H04L 25/03898* (2013.01); *H04L 1/0028* (2013.01); *H04L 5/0048* (2013.01)

(58) Field of Classification Search
USPC ............... 375/267, 260, 259, 219, 295, 316
See application file for complete search history.

(56) References Cited

U.S. PATENT DOCUMENTS

| | | | |
|---|---|---|---|
| 2011/0136495 | A1 | 6/2011 | Chen et al. |
| 2012/0289275 | A1 | 11/2012 | Li et al. |
| 2013/0089158 | A1 | 4/2013 | Wu |
| 2014/0105316 | A1 | 4/2014 | Yuan |
| 2015/0103933 | A1 | 4/2015 | Nagata et al. |
| 2016/0056873 | A1 | 2/2016 | Wang et al. |
| 2016/0057735 | A1 | 2/2016 | Liu et al. |
| 2017/0250781 | A1* | 8/2017 | Golitschek Edler Von Elbwart ................ H04L 5/0094 |
| 2017/0272133 | A1 | 9/2017 | Chen et al. |
| 2019/0158247 | A1 | 5/2019 | Zhang et al. |
| 2020/0083937 | A1 | 3/2020 | Rahman et al. |

FOREIGN PATENT DOCUMENTS

| | | |
|---|---|---|
| CN | 102291199 A | 12/2011 |
| CN | 102299759 A | 12/2011 |
| CN | 102325013 A | 1/2012 |
| CN | 102474312 A | 5/2012 |
| CN | 103095430 A | 5/2013 |
| CN | 103609053 A | 2/2014 |
| CN | 103746779 A | 4/2014 |
| CN | 104202276 A | 12/2014 |
| CN | 105144600 A | 12/2015 |
| CN | 105519007 A | 4/2016 |
| EP | 3427405 A2 | 1/2019 |
| JP | 2014519227 A | 8/2014 |
| JP | 2016512937 A | 5/2016 |
| JP | 2019527969 A | 10/2019 |
| WO | 2013068840 A1 | 5/2013 |
| WO | 2014005257 A1 | 1/2014 |
| WO | 2015096083 A1 | 7/2015 |
| WO | 2017183905 A2 | 10/2017 |

OTHER PUBLICATIONS

Huawei, HiSilicon,"Views on LTE Rel-14",3GPP TSG RAN Meeting #69 Phoenix, USA, Sep. 14-16, 2015 Agenda Item: 14.1 RP-151356,total 24 pages.
InterDigital Communications, LLC,"Hybrid PMI/Analog—Further Details and Extensions ",3GPP TSG RAN WG1 Meeting #60 R1-101308,San Francisco, USA, Feb. 22-26, 2010,total 4 pages.
Extended European Search Report issued in European Application No. 16917235 dated Mar. 15, 2019, 11 pages.
International Search Report and Written Opinion issued in International Application No. PCT/CN2016/100964 dated May 31, 2017, 18 pages.
Huawei et al., "WF on Advanced CSI feedback framework in Rel-14," 3GPP TSG-RAN WG1#86,Gothenburg, Sweden, R1-167971, Aug. 22-26, 2016, 4 pages.
Office Action issued in Japanese Application No. 2018-561,626 dated Nov. 18, 2019, 7 pages (With English Translation).
Office Action issued in Chinese Application No. 201680085257.9 dated Dec. 3, 2019, 9 pages.
Office Action issued in Chinese Application No. 201811472706.2 dated Jun. 13, 2019, 14 pages {With English Translation).
Issue Notification issued in Chinese Application No. 201811472706.2 dated Oct. 9, 2019, 5 pages (with English translation).
Notice of Allowance issued in Chinese Application No. 201811472706.2 dated Oct. 9, 2019, 1 page.
Office Action issued in Chinese Application No. 201811472862.9 dated Dec. 27, 2019, 3 pages (with English Translation).
EPO Communication pursuant to Article 94(3) EPC issued in European Application No. 16917235.0 on Jun. 3, 2020, 8 pages.

* cited by examiner

METHOD AND APPARATUS FOR TRANSMITTING CHANNEL STATE INFORMATION

CROSS-REFERENCE TO RELATED APPLICATIONS

This application is a continuation of International Application No. PCT/CN2016/100964, filed on Sep. 29, 2016. The disclosure of the aforementioned application is hereby incorporated by reference in its entirety.

TECHNICAL FIELD

The present disclosure relates to the communications field, and in particular, to a method and an apparatus for transmitting channel state information in the communications field.

BACKGROUND

In an existing Long Term Evolution (LTE) frequency division duplexing (FDD) system, a terminal device performs channel estimation by using a reference signal sent by a network device and then determines state information of a downlink channel. The terminal device feeds back the state information of the downlink channel to the network device. For example, the terminal device sends a precoding matrix index (PMI), a rank index (RI), and a channel quality index (CQI) to the network device. The network device selects a precoding matrix based on the index information. The network device performs processing by using the precoding matrix, to improve downlink communication quality. Therefore, accuracy of the channel state information fed back by the terminal device affects downlink communication quality. How to improve the accuracy of the channel state information fed back by the terminal device is a problem that needs to be resolved.

SUMMARY

Embodiments of the present invention provide a method and an apparatus for transmitting channel state information, so as to improve feedback precision of state information.

According to a first aspect, a method for transmitting channel state information is provided. The method includes: receiving, by a terminal device, a reference signal sent by a network device; obtaining, by the terminal device, a precoding matrix based on the reference signal; determining, by the terminal device, first amplitude information and second amplitude information of the precoding matrix, where the first amplitude information is used to indicate amplitude quantization information of a wideband, and the second amplitude information is used to indicate amplitude quantization information of N first subbands of the wideband; and sending, by the terminal device, the first amplitude information and the second amplitude information to the network device. The N first subbands are all subbands or some subbands of the wideband.

Therefore, when a feedback manner combining a wideband and a subband is used to feed back amplitude information of a precoding matrix, as compared with feedback in a wideband, precision of feeding back amplitude information of a precoding matrix can be improved. Therefore, precision of feeding back amplitude information can be improved.

Further, when the feedback manner combining a wideband and a subband is used to feed back amplitude information of a precoding matrix, as compared with feedback in a subband, a feedback amount of feeding back amplitude information of a precoding matrix can be reduced, and resource overheads can be reduced.

In a first possible implementation of the first aspect, the first amplitude information is specifically used to indicate an amplitude quantization value of the wideband, the amplitude quantization value of the wideband corresponds to K amplitude quantization values, the second amplitude information is specifically used to indicate an amplitude quantization value of each first subband of the N first subbands, the amplitude quantization value of each first subband is one of the K amplitude quantization values, and K is an integer greater than 0.

Specifically, an amplitude quantization value of one wideband corresponds to K amplitude quantization values of one first subband. That is, if the wideband includes three first subbands, each first subband corresponds to K amplitude quantization values.

Optionally, information about a variation may be a value of the variation or may be an index of the value of the variation. Information about variations of amplitude quantization values of the N first subbands relative to the amplitude quantization value of the wideband may be information about N variations, or may be one variation shared by the amplitude values of the N first subbands. For example, one common variation may be an average value of N variations.

With reference to the foregoing possible implementation of the first aspect, in a second possible implementation of the first aspect, the first amplitude information is specifically used to indicate the amplitude quantization value of the wideband, the second amplitude information is specifically further used to indicate a first direction for adjusting the amplitude quantization values of the N first subbands of the precoding matrix, the first direction is an upward adjustment direction or a downward adjustment direction, the upward adjustment direction represents that the amplitude quantization values of the N first subbands are the amplitude quantization value of the wideband plus variations, and the downward adjustment direction represents that the amplitude quantization values of the N first subbands are the amplitude quantization value of the wideband minus variations.

Optionally, the variations in the second possible implementation of the first aspect may be variations in the first possible implementation of the first aspect or may be preset variations specified in a protocol.

With reference to the foregoing possible implementations of the first aspect, in a third possible implementation of the first aspect, the first amplitude information is specifically used to indicate the amplitude quantization value of the wideband and a candidate amplitude quantization value set of the N first subbands that corresponds to the amplitude quantization value of the wideband, and the second amplitude information is specifically further used to indicate amplitude quantization values of the N first subbands in the candidate amplitude quantization value set.

Specifically, the amplitude quantization value of the wideband indicated by the first amplitude information is in a correspondence with the candidate amplitude set. That is, an amplitude value of one wideband corresponds to one amplitude value set. The amplitude value set may be amplitude values of subbands of the wideband. The correspondence may be specified in a protocol, or certainly may be configured by the network device for the terminal device.

With reference to the foregoing possible implementations of the first aspect, in a fourth implementation of the first aspect, the first amplitude information is one of L pieces of amplitude quantization information corresponding to the precoding matrix, the amplitude quantization information of each first subband of the N first subbands is one of P pieces of amplitude quantization information corresponding to the precoding matrix, L and P are integers greater than or equal to 0, and L is greater than P.

With reference to the foregoing possible implementations of the first aspect, in a fifth implementation of the first aspect, the method further includes: sending, by the terminal device, phase information of the precoding matrix to the network device, where the phase information is used to indicate phase quantization information of M second subbands of the wideband, a quantity of resource blocks included in each first subband of the N first subbands is greater than a quantity of resource blocks included in each second subband of the M second subbands, and M and N are integers greater than 0, that is, it may be understood that N is less than M.

With reference to the foregoing possible implementations of the first aspect, in a sixth implementation of the first aspect, the sending, by the terminal device, the first amplitude information and the second amplitude information to the network device includes: sending, by the terminal device, the first amplitude information to the network device at intervals of a first time period; and sending, by the terminal device, the second amplitude information to the network device at intervals of a second time period, where the first time period is longer than or equal to the second time period.

Optionally, the terminal device may simultaneously send the first amplitude information and the second amplitude information to the network device, or may separately send the first amplitude information and the second amplitude information.

With reference to the foregoing possible implementations of the first aspect, in a seventh implementation of the first aspect, before the sending, by the terminal device, the first amplitude information and the second amplitude information to the network device, the method further includes:

receiving, by the terminal device, first instruction information sent by the network device, where the first instruction information is used to instruct the terminal device to feed back the first amplitude information and the second amplitude information; and the sending, by the terminal device, the first amplitude information and the second amplitude information to the network device includes: sending, by the terminal device, the first amplitude information and the second amplitude information to the network device according to the first instruction information.

With reference to the foregoing possible implementations of the first aspect, in an eighth implementation of the first aspect, the terminal device may feed back amplitude information of the precoding matrix by using a wideband, or the terminal device may feed back amplitude information of the precoding matrix by using a subband, or the terminal device may feedback amplitude information of the precoding matrix by using a manner combining a wideband and a subband. Specifically, the terminal device may use an instruction manner. For example, before the terminal device feeds back the amplitude information of the precoding matrix, the network device sends second instruction information to the terminal device, to instruct the terminal device to use which manner to feed back the amplitude information of the precoding matrix, and the terminal device determines a feedback manner of feeding back the amplitude information of the precoding matrix based on the second instruction information from the network device; when the second instruction information instructs the terminal device to use a subband to feed back amplitude information of the precoding matrix, the terminal device uses a subband to feed back the amplitude information of the precoding matrix, or when the second instruction information instructs the terminal device to use a wideband to feed back amplitude information of the precoding matrix, the terminal device use a wideband to feed back the amplitude information of the precoding matrix, or when the second instruction information instructs the terminal device to use a manner combining a wideband and a subband to feed back amplitude information of the precoding matrix, the terminal device uses a manner combining a wideband and a subband to feed back the amplitude information of the precoding matrix in the embodiments of the present invention.

According to a second aspect, a method for transmitting channel state information is provided. The method includes: sending, by a network device, a reference signal to a terminal device, so that the terminal device obtains a precoding matrix based on the reference signal; receiving, by the network device, first amplitude information and second amplitude information of the precoding matrix that are sent by the terminal device, where the first amplitude information is used to indicate amplitude quantization information of a wideband, and the second amplitude information is used to indicate amplitude quantization information of N first subbands of the wideband; and determining, by the network device, the precoding matrix based on the first amplitude information and the second amplitude information.

In a first possible implementation of the second aspect, the first amplitude information is specifically used to indicate an amplitude quantization value of the wideband, the amplitude quantization value of the wideband corresponds to K amplitude quantization values, the second amplitude information is specifically used to indicate an amplitude quantization value of each first subband of the N first subbands, the amplitude quantization value of each first subband is one of the K amplitude quantization values, and K is an integer greater than 0.

With reference to the foregoing possible implementation of the second aspect, in a second implementation of the second aspect, the first amplitude information is specifically used to indicate the amplitude quantization value of the wideband, the second amplitude information is specifically further used to indicate a first direction for adjusting the amplitude quantization values of the N first subbands of the precoding matrix, the first direction is an upward adjustment direction or a downward adjustment direction, the upward adjustment direction represents that the amplitude quantization values of the N first subbands are the amplitude quantization value of the wideband plus variations, and the downward adjustment direction represents that the amplitude quantization values of the N first subbands are the amplitude quantization value of the wideband minus variations.

With reference to the foregoing possible implementations of the second aspect, in a third implementation of the second aspect, the first amplitude information is specifically used to indicate the amplitude quantization value of the wideband and a candidate amplitude quantization value set of the N first subbands that corresponds to the amplitude quantization value of the wideband, and the second amplitude information is specifically further used to indicate amplitude quantization values of the N first subbands in the candidate amplitude quantization value set.

With reference to the foregoing possible implementations of the second aspect, in a fourth implementation of the second aspect, the determining, by the network device, the precoding matrix based on the first amplitude information and the second amplitude information includes: determining, by the network device, amplitude information of the wideband based on the first amplitude information; determining, by the network device, amplitude information of the N first subbands based on the amplitude information of the wideband and the second amplitude information; and determining, by the network device, the precoding matrix based on the amplitude information of the N first subbands.

With reference to the foregoing possible implementations of the second aspect, in a fifth implementation of the second aspect, the first amplitude information is one of L pieces of amplitude quantization information corresponding to the precoding matrix, the amplitude quantization information of each first subband of the N first subbands is one of P pieces of amplitude quantization information corresponding to the precoding matrix, L and P are integers greater than or equal to 0, and L is greater than P.

With reference to the foregoing possible implementations of the second aspect, in a sixth implementation of the second aspect, the method further includes: sending, by the network device, phase information of the precoding matrix to the terminal device, where the phase information is used to indicate phase quantization information of M second subbands of the wideband, and a quantity of resource blocks included in the N first subbands is greater than a quantity of resource blocks included in the M second subbands.

With reference to the foregoing possible implementations of the second aspect, in a seventh implementation of the second aspect, the receiving, by the network device, first amplitude information and second amplitude information of the precoding matrix that are sent by the terminal device includes: receiving, by the network device at intervals of a first time period, the first amplitude information sent by the terminal device; and sending, by the network device, the second amplitude information to the terminal device at intervals of a second time period, where the first time period is longer than or equal to the second time period.

With reference to the foregoing possible implementations of the second aspect, in an eighth implementation of the second aspect, before the receiving, by the network device, first amplitude information and second amplitude information of the precoding matrix that are sent by the terminal device, the method further includes: sending, by the network device, first instruction information to the terminal device, where the first instruction information is used to instruct the terminal device to feed back the first amplitude information and the second amplitude information; and the receiving, by the network device, first amplitude information and second amplitude information of the precoding matrix that are sent by the terminal device includes: receiving, by the network device, the first amplitude information and the second amplitude information that are sent by the terminal device according to the first instruction information.

According to a third aspect, receiving, by a terminal device, a reference signal sent by a network device; obtaining, by the terminal device, a precoding matrix based on the reference signal; sending, by the terminal device, amplitude information of the precoding matrix to the network device, where the amplitude information is used to indicate amplitude quantization information of N first subbands of a wideband; and sending, by the terminal device, phase information of the precoding matrix to the network device, where the phase information is used to indicate phase quantization information of M second subbands of the wideband, and a quantity of resource blocks included in each first subband of the N first subbands is greater than a quantity of resource blocks included in each second subband of the M second subbands.

According to a fourth aspect, sending, by a network device, a reference signal to a terminal device; receiving, by the network device, amplitude information of a precoding matrix sent by the terminal device, where the amplitude information is used to indicate amplitude quantization information of N first subbands of a wideband; and receiving, by the network device, phase information of the precoding matrix sent by the terminal device, where the phase information is used to indicate phase quantization information of M second subbands of the wideband, and a quantity of resource blocks included in the N first subbands is greater than a quantity of resource blocks included in the M second subbands.

According to a fifth aspect, an apparatus for transmitting channel state information is provided, and is configured to perform the method according to the first aspect or any possible implementation of the first aspect. Specifically, the apparatus includes units configured to perform the method according to the first aspect or any possible implementation of the first aspect.

According to a sixth aspect, an apparatus for transmitting channel state information is provided, and is configured to perform the method according to the second aspect or any possible implementation of the second aspect. Specifically, the apparatus includes units configured to perform the method according to the second aspect or any possible implementation of the second aspect.

According to a seventh aspect, an apparatus for transmitting channel state information is provided, and is configured to perform the method according to the first aspect or any possible implementation of the first aspect. Specifically, the apparatus includes units configured to perform the method according to the third aspect or any possible implementation of the third aspect.

According to an eighth aspect, an apparatus for transmitting channel state information is provided, and is configured to perform the method according to the second aspect or any possible implementation of the second aspect. Specifically, the apparatus includes units configured to perform the method according to the fourth aspect or any possible implementation of the fourth aspect.

According to a ninth aspect, a system for transmitting channel state information is provided. The system includes the apparatus according to the seventh aspect or any possible implementation of the seventh aspect and the apparatus according to the eighth aspect or any possible implementation of the eighth aspect.

According to a tenth aspect, an apparatus for transmitting channel state information is provided, and the device includes a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution enables the processor to perform the method according to the first aspect or any possible implementation of the first aspect.

According to an eleventh aspect, an apparatus for transmitting channel state information is provided, and the device includes a receiver, a transmitter, a memory, a processor, and a bus system. The receiver, the transmitter, the memory, and the processor are connected by using the bus system.

The memory is configured to store an instruction. The processor is configured to execute the instruction stored in the memory, to control the receiver to receive a signal and control the transmitter to send a signal. When the processor executes the instruction stored in the memory, the execution enables the processor to perform the method according to the second aspect or any possible implementation of the second aspect.

According to a twelfth aspect, an apparatus for transmitting channel state information is provided, and the device includes a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution enables the processor to perform the method according to the third aspect or any possible implementation of the third aspect.

According to a thirteenth aspect, an apparatus for transmitting channel state information is provided, and the device includes a receiver, a transmitter, a memory, a processor, and a bus system.

The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution enables the processor to perform the method according to the fourth aspect or any possible implementation of the fourth aspect.

According to a fourteenth aspect, a computer readable medium is provided, configured to store a computer program, where the computer program includes an instruction used to perform the method according to the first aspect or any possible implementation of the first aspect.

According to a fifteenth aspect, a computer readable medium is provided, configured to store a computer program, where the computer program includes an instruction used to perform the method according to the second aspect or any possible implementation of the second aspect.

According to a sixteenth aspect, a computer readable medium is provided, configured to store a computer program, where the computer program includes an instruction used to perform the method according to the third aspect or any possible implementation of the third aspect.

According to a seventeenth aspect, a computer readable medium is provided, configured to store a computer program, where the computer program includes an instruction used to perform the method according to the fourth aspect or any possible implementation of the fourth aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be understood that the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, a future possible communications system, or the like.

Figure 1:
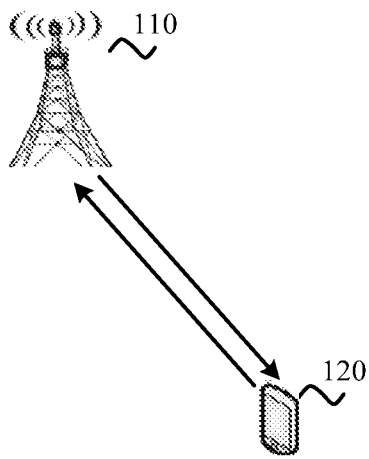
FIG. 1 is a schematic diagram of an application scenario according to an embodiment of the present invention.

FIG. 1 is a schematic diagram of an application scenario according to an embodiment of the present invention. A communications system 100 in FIG. 1 may include a network device 110 and a terminal device 120. The network device 110 is configured to provide a communication service for the terminal device 120 and access to a core network. The terminal device 120 searches for a synchronization signal, a broadcast signal, or the like sent by the network device 110 to access a network, so as to perform communication with the network. An arrow shown in FIG. 1 may represent uplink/downlink transmission performed by using a cellular link between the terminal device 120 and the network device 110.

In this embodiment of the present invention, the network device 110 may be configured to communicate with a mobile device. The network device 110 may be a base transceiver station (BTS) in a Global System for Mobile communications (GSM) or Code Division Multiple Access (CDMA), or may be a NodeB (NB) in Wideband Code Division Multiple Access (WCDMA), or may be an evolved NodeB (eNB or "eNodeB") in LTE, or a relay station or an access point, or an in-vehicle device, a wearable device and an access network device in a future 5G network.

The terminal device 120 may be referred to as user equipment (UE), a terminal device, a mobile station (MS), a mobile terminal, or a terminal device in a future 5G network. The terminal device may communicate with one or more core networks by using a radio access network (RAN). For example, the terminal may be a mobile phone (or referred to as a "cellular" phone) or a computer with a mobile terminal. For example, the terminal may alternatively be a portable, pocket-sized, handheld, computer built-in, or in-vehicle mobile apparatus, which exchanges voice and/or data with the radio access network.

Figure 2:
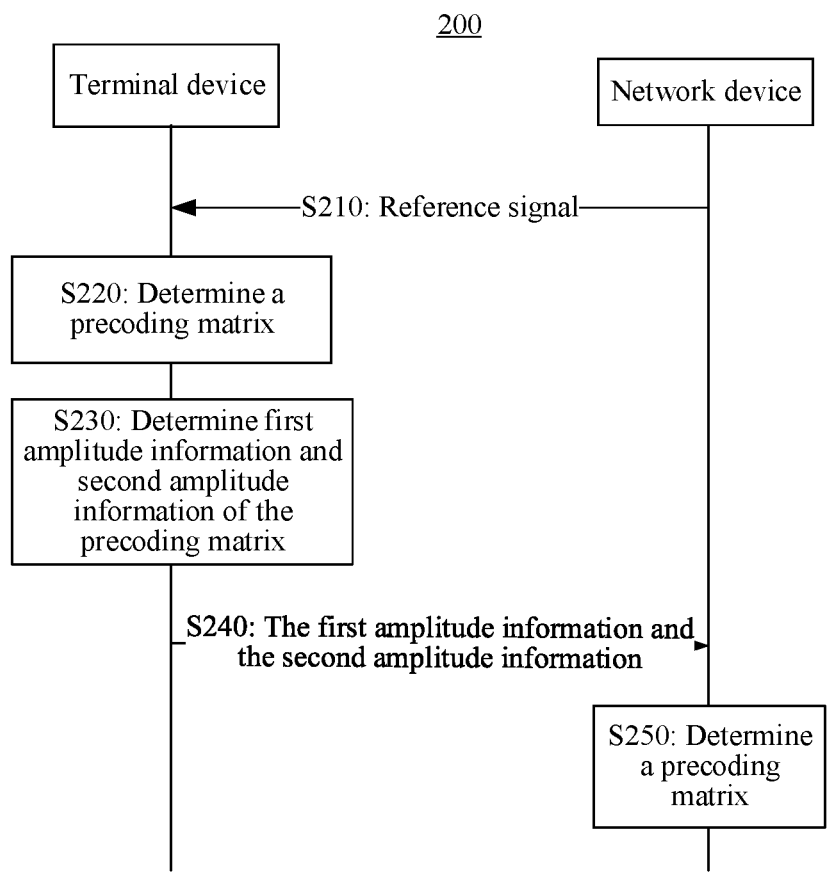
FIG. 2 is a schematic diagram of a method for transmitting channel state information according to an embodiment of the present invention.

FIG. 2 is a schematic flowchart of a method 200 for transmitting channel state information according to an embodiment of the present invention. FIG. 2 shows steps or operations in the method for transmitting channel state information, but these steps or operations are only an example. Other operations or variations of the operations in FIG. 2 may be further performed in this embodiment of the present invention. The method 200 includes the following steps.

S210: A network device 110 sends a reference signal to a terminal device 120.

The reference signal is used by the terminal device to determine channel state information (CSI) between the network device and the terminal device, such as a PMI, an RI, and a CQI.

S220: The terminal device 120 receives the reference signal sent by the network device 110, and the terminal device 120 obtains a precoding matrix based on the reference signal.

S230: The terminal device determines first amplitude information and second amplitude information of the precoding matrix, where the first amplitude information is used to indicate amplitude quantization information of a wideband, and the second amplitude information is used to indicate amplitude quantization information of N first subbands of the wideband.

In an optional embodiment, the first amplitude information is one of L pieces of amplitude quantization information corresponding to the precoding matrix, the amplitude quantization information of each first subband of the N first subbands is one of P pieces of amplitude quantization information corresponding to the precoding matrix, L and P are integers greater than or equal to 0, and L is greater than P.

Specifically, a quantity of amplitude quantization information included in an amplitude quantization information set corresponding to the wideband is greater than a quantity of amplitude quantization information included in an amplitude quantization information set corresponding to each first subband. The amplitude quantization information set corresponding to the wideband or each first subband may be a set composed of amplitude quantization values, or the amplitude quantization information set corresponding to the wideband or each first subband may be a set composed of indexes corresponding to amplitude quantization values. For example, an amplitude quantization value set corresponding to the wideband is {0.25, 0.5, 1, 2}. Four amplitude quantization value sets corresponding to the first subbands are {0.125, 0.375}, {0.375, 0.625}, {0.875, 1.125}, and {0.875, 2.125}. 0.25 in the amplitude quantization value set corresponding to the wideband corresponds to {0.125, 0.375}. 0.5 in the amplitude quantization value set corresponding to the wideband corresponds to {0.375, 0.625}. 1 in the amplitude quantization value set corresponding to the wideband corresponds to {0.875, 1.125}. 2 in the amplitude quantization value set corresponding to the wideband corresponds to {0.875, 2.125}.

It should be understood that the amplitude quantization value set corresponding to the wideband may be specified in a protocol or configured in a network; the amplitude quantization value set corresponding to each first subband may be specified in a protocol or configured in a network; and a correspondence between the amplitude quantization value set corresponding to the wideband and the amplitude quantization value set corresponding to each first subband may be specified in a protocol or configured in a network. This is not limited in this embodiment of the present invention.

Optionally, amplitude values of elements in the precoding matrix may vary greatly. Therefore, it is impossible to use a universal index for indication. Therefore, normalization processing needs to be performed on the amplitude values of the elements in the precoding matrix, and the normalized amplitude values are then quantized.

It should be understood that the first amplitude information may be an amplitude quantization value of the wideband of the precoding matrix, or may be an index of the amplitude quantization value of the wideband of the precoding matrix. This is not limited in this embodiment of the present invention. Similarly, the second amplitude information may be N amplitude quantization values of the N first subbands of the wideband of the precoding matrix, or may be N indexes of the N amplitude quantization values of the N first subbands of the wideband of the precoding matrix.

It should be understood that the following examples are used for convenience of description. It is assumed that there is only one amplitude quantization value of each first subband of the N first subbands of the wideband. In practice, a quantity of amplitude quantization values of each first subband of the N first subbands is related to a quantity of antennas. A correspondence may exist between the first amplitude information and the second amplitude information. The correspondence may be that an absolute value of a difference between the amplitude quantization value of the wideband indicated by the first amplitude information and the amplitude quantization value on the first subband is less than a threshold, or the correspondence may be that a differential relationship exists between the amplitude quantization value of the wideband indicated by the first amplitude information and the amplitude quantization values of the N first subbands. The correspondence may be configured by the network device for the terminal device, and the correspondence is stored on both the network device and the terminal device. Alternatively, the correspondence may be specified in a protocol. This is not limited in this embodiment of the present invention. For example, there may be the following three relationships.

In a first relationship, the first amplitude information is specifically used to indicate an amplitude quantization value of the wideband, and the second amplitude information is specifically used to indicate information about variations of amplitude quantization values of the N first subbands relative to the amplitude quantization value of the wideband. That is, the information about the variations may be information about N variations. The information about the N variations may be values of the N variations or may be indexes corresponding to the values of the N variations. The information about the variations may alternatively be a value of one amplitude variation shared by the N first subbands, or the information about the variations may be an index of the value of the one amplitude variation shared by the N first subbands. For example, it is assumed that the wideband includes five first subbands. The first amplitude information may be an index of the amplitude quantization value being 2. The second amplitude information may be indexes of five variations of amplitude quantization values of the five first subbands relative to the amplitude quantization value of the wideband being 2. The five variations are 0.1, 0.2, 0.3, 0.4, and 0.5. In this case, the second amplitude information may be five indexes of 0.1, 0.2, 0.3, 0.4, and 0.5. Assuming that it is specified in a protocol between the network device and the terminal device that variations are increments based on the amplitude quantization value of the wideband, when the network device receives the first amplitude information and the second amplitude information, it may be determined that amplitude quantization values of the N first subbands are 2.1, 2.2, 2.3, 2.4, and 2.5. Alternatively, when variations specified by the network device and the terminal device are increments based on the amplitude quantization value of the wideband, assuming that an amplitude quantization value of one first subband of the five first subbands is 1.8, the second amplitude information may be an index of a variation being −0.2. Assuming that it is specified in a protocol between the network device and the terminal device that variations are decrements based on the amplitude quantization value of the wideband, when the network device receives the first amplitude information and the second amplitude information, it may be determined that the amplitude quantization values of the N first subbands are 1.9, 1.8, 1.7, 1.6, and 1.5.

In a second relationship, the first amplitude information is specifically used to indicate the amplitude quantization value of the wideband, the second amplitude information is specifically further used to indicate a first direction for adjusting the amplitude quantization values of the N first subbands of the precoding matrix, the first direction is an upward adjustment direction or a downward adjustment direction, the upward adjustment direction represents that the amplitude quantization values of the N first subbands are the amplitude quantization value of the wideband plus variations, and the downward adjustment direction represents that the amplitude quantization values of the N first subbands are the amplitude quantization value of the wideband minus variations. That is, the amplitude value indicated by the first amplitude information is still the amplitude quantization value of the wideband of the precoding matrix, and the second amplitude information is the first direction of adjustment on the first subbands. Assuming that the first direction is an upward adjustment direction, the amplitude quantization values of the first subbands are the amplitude quantization value of the wideband plus variations, and the added variations may be preset variations, or the added variations may be the N variations in the first relationship. The preset variations of the first subband may be equal or not equal. Assuming that the first direction is a downward adjustment direction, the amplitude quantization values of the first subbands are the amplitude quantization value of the wideband minus variations. The subtracted variations may be preset variations, or the subtracted variations may be the variations in the first relationship. That is, the first relationship and the second relationship may exist at the same time between the first amplitude information and the second amplitude information. The first amplitude information indicates the amplitude quantization value of the wideband, and the second amplitude information indicates the variations of the first subbands relative to the wideband and adjustment directions of the variations. This is not limited in this embodiment of the present invention.

For example, it is assumed that the wideband includes five first subbands. The first amplitude information may be an index of the amplitude quantization value being 2 of the wideband. The second amplitude information may indicate five first directions of the amplitude quantization values of five first subbands relative to the amplitude quantization value being 2 of the wideband. The five first directions are respectively an upward adjustment direction, a downward adjustment direction, a downward adjustment direction, an upward adjustment direction, and an upward adjustment direction. For example, an index of the upward adjustment direction is 1, and an index of the downward adjustment direction is 0. In this case, the second amplitude information is 10011. Assuming that it is specified in a protocol between the network device and the terminal device that an adjustment size of an amplitude quantization value is 0.1, when the network device receives the first amplitude information and the second amplitude information, it may be determined, based on the first amplitude information and the second amplitude information, that the amplitude quantization values of the five first subbands are 2.1, 1.9, 1.9, 2.1, and 2.1. Certainly, the first amplitude information may be an index of the amplitude quantization value being 2 of the wideband, and the second amplitude information may be indexes of variations being 0.1, 0.1, 0.3, 0.4, and 0.2 of the amplitude quantization values of the five first subbands relative to the amplitude quantization value of the wideband, and adjustment directions being 10011 of the amplitude quantization values of the five first subbands relative to the amplitude quantization value of the wideband. When the network device receives the first amplitude information and the second amplitude information, it may be determined, based on the first amplitude information and the second amplitude information, that amplitude values of the five first subbands are respectively 2.1, 1.9, 1.7, 2.4, and 2.2.

In a third relationship, the first amplitude information is specifically used to indicate an amplitude quantization value of the wideband, the amplitude quantization value of the wideband corresponds to K amplitude quantization values, the second amplitude information is specifically used to indicate an amplitude quantization value of each first subband of the N first subbands, the amplitude quantization value of each first subband is one of the K amplitude quantization values, and K is an integer greater than 0. That is, one amplitude quantization value of the wideband corresponds to K amplitude quantization values, and an amplitude quantization value of one first subband is one of the K amplitude quantization values. When the terminal device sends the first amplitude information to the network device, the amplitude quantization value of the wideband indicated by the first amplitude information corresponds to K amplitude quantization values. When the terminal device sends the second amplitude information to the network device, the network device may determine the amplitude quantization values of the N first subbands from the K amplitude quantization values based on the information indicated by the second amplitude information.

For example, the wideband includes two first subbands. The first amplitude information is an index of the amplitude quantization value being 0.25 of the wideband. Three amplitude quantization values of the subbands corresponding to 0.25 are {0.125, 0.2, 0.375}. The terminal device determines two amplitude values from the set and finds that amplitude quantization values of the two first subbands are 0.125 and 0.375. Indexes of 0.125 and 0.375 are then reported to the network device. The network device may determine an amplitude value of the wideband based on the index of 0.25, next, find the set {0.125, 0.2, 0.375} based on the amplitude value being 0.25, and determine, based on the indexes of 0.125 and 0.375, that the amplitude values of the subbands in the set are 0.125 and 0.375, so as to further determine the amplitude values of the subbands.

It should be understood that for the three relationships that exist between the first amplitude information and the second amplitude information, which one of the three relationships is used between the network device and the terminal device may be specified in a protocol. Alternatively, the network device may configure, for the terminal device, which manner is used by the terminal device to determine the first amplitude information and the second amplitude information. Certainly, the three relationships between the first amplitude information and the second amplitude information may be identified by three types of identification information. When the network device and the terminal device determine a relationship that is used between the first amplitude information and the second amplitude information, identification information of the relationship is carried in a downlink message, and the downlink message is sent to the terminal device. For example, the identification information is carried in a special bit specified in a protocol for indication. Alternatively, the special bit has different values to represent different correspondences between the first amplitude information and the second amplitude information. For example, when the value of the bit is 1, the bit represents the first relationship. This is not limited in this embodiment of the present invention.

It should be further understood that the three relationships mentioned above are only described as examples. Any relationship may exist between the first amplitude information and the second amplitude information. For example, amplitude values of the wideband indicated by the first amplitude information are not quantized by using a numerical value, but instead, may be indicated based on an interval to which the amplitude value of the wideband belongs. For example, for the amplitude value of the wideband, there are three intervals, namely, a first interval, a second interval, and a third interval. An index of the first interval indicated by the first amplitude information corresponds to a first set of one subband, an index of the second interval indicated by the first amplitude information corresponds to a second set of one subband, and an index of the third interval indicated by the first amplitude information corresponds to a third set of one subband, and the like. Therefore, the relationship between the first amplitude information and the second amplitude information is not limited in any way in this embodiment of the present invention.

S240: The terminal device sends the first amplitude information and the second amplitude information to the network device.

In an optional embodiment, S240 includes: sending, by the terminal device, the first amplitude information to the network device at intervals of a first time period; and sending, by the terminal device, the second amplitude information to the network device at intervals of a second time period; and the receiving, by the network device, first amplitude information and second amplitude information of the precoding matrix that are sent by the terminal device includes: receiving, by the network device at intervals of the first time period, the first amplitude information sent by the terminal device; and sending, by the network device, the second amplitude information to the terminal device at intervals of the second time period, where the first time period is longer than or equal to the second time period.

Specifically, the terminal device may simultaneously send the first amplitude information and the second amplitude information to the network device, or may separately send the first amplitude information and the second amplitude information. When the first time period is equal to the second time period, there may be two cases: In a first case, the terminal device periodically sends the first amplitude information and the second amplitude information to the network device at the same time, and the network device periodically receives the first amplitude information and the second amplitude information. In a second case, the terminal device separately sends the first amplitude information and the second amplitude information to the network device, but the same sending period is used for sending the two types of amplitude information. When the first time period is longer than the second time period, that is, a period of feeding back the amplitude information of the wideband may be longer than a period of feeding back amplitude information of subbands, because the feedback of the amplitude information of the subbands depends on the feedback of amplitude information of the wideband. In this way, the number of times of feeding back the amplitude information of the wideband can be reduced, and overheads of feeding back the amplitude information can be reduced. Specific sending manners of sending the first amplitude information and the second amplitude information are not limited in this embodiment of the present invention. Any sending manner may be used. A sending manner specified in a protocol may be used, or a sending manner configured by the network device for the terminal device may be used.

In an optional embodiment, before the receiving, by the network device, first amplitude information and second amplitude information of the precoding matrix that are sent by the terminal device, the method 200 further includes: sending, by the network device, first instruction information to the terminal device, where the first instruction information is used to instruct the terminal device to feed back the first amplitude information and the second amplitude information; before the sending, by the terminal device, the first amplitude information and the second amplitude information to the network device, the method 200 further includes: receiving, by the terminal device, the first instruction information sent by the network device; and the sending, by the terminal device, the first amplitude information and the second amplitude information to the network device includes: sending, by the terminal device, the first amplitude information and the second amplitude information to the network device according to the first instruction information. The receiving, by the network device, first amplitude information and second amplitude information of the precoding matrix that are sent by the terminal device includes: receiving, by the network device, the first amplitude information and the second amplitude information that are sent by the terminal device according to the first instruction information.

Specifically, it may be configured in a network that the terminal device sends both wideband and subband amplitude quantization information of the precoding matrix to the network device. For example, the first instruction information sent by the network device is used to instruct the terminal device to send both wideband and subband the amplitude quantization information of the precoding matrix.

In an optional embodiment, the terminal device may send wideband amplitude information of the precoding matrix to the network device, the terminal device may send subbband amplitude information of the precoding matrix to the network device, or the terminal device may send both wideband and subband amplitude information of the precoding matrix to the network device. For a specific manner that the terminal device uses to send the amplitude information of the precoding matrix, the network device may send indication information to the terminal device to indicate the manner that the terminal device uses to send the amplitude information of the precoding matrix.

S250: The network device receives the first amplitude information and the second amplitude information, and determines the precoding matrix based on the first amplitude information and the second amplitude information. The precoding matrix determined here may be the same as the precoding matrix determined in S220, or the precoding matrix determined by the network device may be similar to the precoding matrix determined in S220.

In an optional embodiment, S250 includes: determining, by the network device, amplitude information of the wideband based on the first amplitude information; determining, by the network device, amplitude information of the N first subbands based on the amplitude information of the wideband and the second amplitude information; and determining, by the network device, the precoding matrix based on the amplitude information of the N first subbands. That is, after receiving the first amplitude information and the second amplitude information, the network device first determines the amplitude value of the wideband based on the first amplitude information, and then determines amplitude values of the N first subbands of the wideband based on the amplitude value of the wideband. Specifically, when both the network device and the terminal device learn that one of the three relationships exists between the first amplitude information and the second amplitude information, amplitude values of the N first subbands are determined based on the relationship, and the precoding matrix is further determined.

In an optional embodiment, the method 200 further includes: sending, by the terminal device, phase information of the precoding matrix to the network device, where the phase information is used to indicate phase quantization information of M second subbands of the wideband, and a quantity of resource blocks included in the N first subbands is greater than a quantity of resource blocks included in the M second subbands.

Specifically, among elements of the precoding matrix, phase information is more important than amplitude information. Therefore, a quantity of resource blocks included in the M second subbands of the wideband for sending the phase information may be less than a quantity of resource blocks included in the N first subbands. In this way, accuracy of feeding back the phase information may be further ensured.

Figure 3:
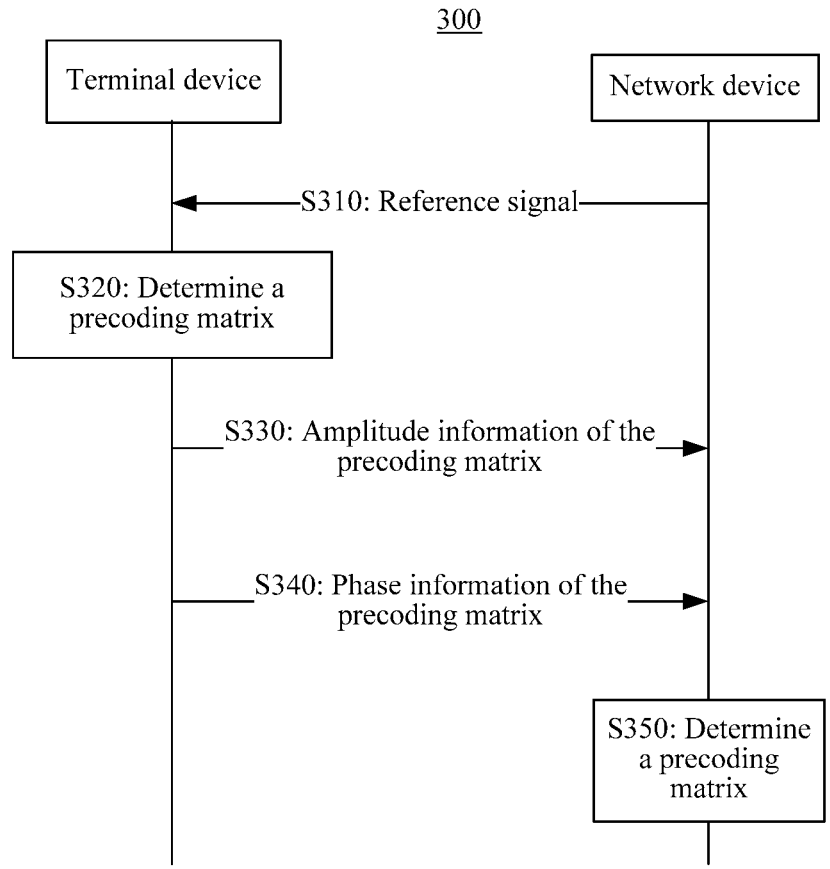
FIG. 3 is a schematic diagram of another method for transmitting channel state information according to an embodiment of the present invention.

FIG. 3 shows a method 300 for transmitting channel state information according to an embodiment of the present invention. The method 300 includes the following steps:

S310: A network device sends a reference signal to a terminal device.

S320: The terminal device receives the reference signal sent by the network device, and the terminal device obtains a precoding matrix based on the reference signal.

S330: The terminal device sends amplitude information of the precoding matrix to the network device, and the network device receives the amplitude information of the precoding matrix sent by the terminal device, where the amplitude information is used to indicate amplitude quantization information of N first subbands of a wideband.

S340: The terminal device sends phase information of the precoding matrix to the network device, and the network device receives the phase information of the precoding matrix sent by the terminal device, where the phase information is used to indicate phase quantization information of M second subbands of the wideband, and a quantity of resource blocks included in each first subband of the N first subbands is greater than a quantity of resource blocks included in each second subband of the M second subbands.

S350: The network device receives the amplitude information of the precoding matrix sent by the terminal device, the network device receives the phase information of the precoding matrix sent by the terminal device, and the network device determines a precoding matrix based on the amplitude information of the precoding matrix and the phase information of the precoding matrix. The precoding matrix determined here may be the same as the precoding matrix determined in S320. Alternatively, the precoding matrix determined by the network device may be similar to the precoding matrix determined in S320.

Specifically, the phase information of the precoding matrix is more important than the amplitude information of the precoding matrix. Therefore, a subband manner needs to be used to transmit the phase information of the precoding matrix. When a subband manner is also used to transmit the amplitude information of the precoding matrix, on a same wideband, a quantity of resource blocks included in each subband for transmitting the amplitude information is greater than a quantity of resource blocks included in each subband for transmitting the phase information. That is, M is greater than N. In this way, during feedback of the phase information and amplitude information of the precoding matrix, a quantity of feedback times is reduced, and precision of feeding back the phase information of the precoding matrix can be improved.

The methods for transmitting channel state information in the embodiments of the present invention are described above with reference to FIG. 2 and FIG. 3. An apparatus for transmitting channel state information in the embodiments of the present invention is described below with reference to FIG. 4 to FIG. 11.

Figure 4:
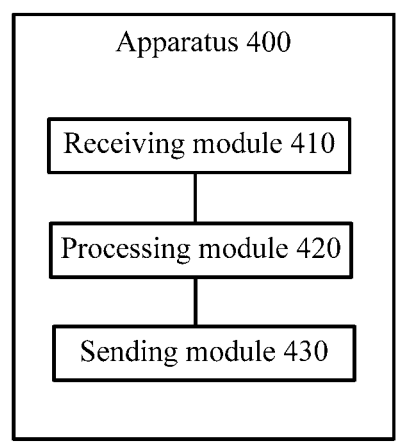
FIG. 4 is a schematic block diagram of an apparatus for transmitting channel state information according to an embodiment of the present invention.

FIG. 4 is a schematic diagram of an apparatus 400 for transmitting channel state information according to an embodiment of the present invention. The apparatus may be, for example, the terminal device in the method 200. The apparatus 400 includes:

a receiving module 410, configured to receive a reference signal sent by a network device;

a processing module 420, configured to obtain a precoding matrix based on the reference signal, where the processing module 420 is further configured to determine first amplitude information and second amplitude information of the precoding matrix, where the first amplitude information is used to indicate amplitude quantization information of a wideband, and the second amplitude information is used to indicate amplitude quantization information of N first subbands of the wideband; and a sending module 430, configured to send the first amplitude information and the second amplitude information to the network device.

In an optional embodiment, the first amplitude information is specifically used to indicate an amplitude quantization value of the wideband, the amplitude quantization value of the wideband corresponds to K amplitude quantization values, the second amplitude information is specifically used to indicate an amplitude quantization value of each first subband of the N first subbands, the amplitude quantization value of each first subband is one of the K amplitude quantization values, and K is an integer greater than 0.

In an optional embodiment, the first amplitude information is specifically used to indicate the amplitude quantization value of the wideband, the second amplitude information is specifically further used to indicate a first direction for adjusting the amplitude quantization values of the N first subbands of the precoding matrix, the first direction is an upward adjustment direction or a downward adjustment direction, the upward adjustment direction represents that the amplitude quantization values of the N first subbands are the amplitude quantization value of the wideband plus variations, and the downward adjustment direction represents that the amplitude quantization values of the N first subbands are the amplitude quantization value of the wideband minus variations.

In an optional embodiment, the first amplitude information is specifically used to indicate the amplitude quantization value of the wideband and a candidate amplitude quantization value set of the N first subbands that corresponds to the amplitude quantization value of the wideband, and the second amplitude information is specifically further used to indicate amplitude quantization values of the N first subbands in the candidate amplitude quantization value set.

In an optional embodiment, the first amplitude information is one of L pieces of amplitude quantization information corresponding to the precoding matrix, the amplitude quantization information of each first subband of the N first subbands is one of P pieces of amplitude quantization information corresponding to the precoding matrix, L and P are integers greater than or equal to 0, and L is greater than P.

In an optional embodiment, the sending module 430 is further configured to send phase information of the precoding matrix to the network device, where the phase information is used to indicate phase quantization information of M second subbands of the wideband, and a quantity of resource blocks included in each first subband of the N first subbands is greater than a quantity of resource blocks included in each second subband of the M second subbands.

In an optional embodiment, the apparatus 400 further includes: a receiving module, configured to: before the first amplitude information and the second amplitude information are sent to the network device, receive first instruction information sent by the network device, where the first instruction information is used to instruct the terminal device to feed back the first amplitude information and the second amplitude information; and the sending module 430 is specifically configured to send the first amplitude information and the second amplitude information to the network device according to the first instruction information.

Figure 5:
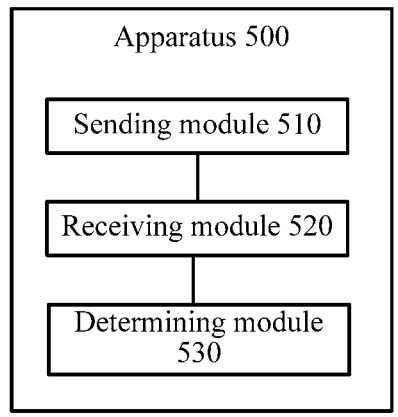
FIG. 5 is a schematic block diagram of another apparatus for transmitting channel state information according to an embodiment of the present invention.

FIG. 5 is a schematic diagram of an apparatus 500 for transmitting channel state information according to an embodiment of the present invention. The apparatus may be, for example, the network device in the method 200. The apparatus 500 includes:

a sending module 510, configured to send a reference signal to a terminal device, so that the terminal device obtains a precoding matrix based on the reference signal;

a receiving module 520, configured to receive first amplitude information and second amplitude information of the precoding matrix that are sent by the terminal device, where the first amplitude information is used to indicate amplitude quantization information of a wideband, and the second amplitude information is used to indicate amplitude quantization information of N first subbands of the wideband; and a determining module 530, configured to determine a precoding matrix based on the first amplitude information and the second amplitude information.

In an optional embodiment, the first amplitude information is specifically used to indicate an amplitude quantization value of the wideband, the amplitude quantization value of the wideband corresponds to K amplitude quantization values, the second amplitude information is specifically used to indicate an amplitude quantization value of each first subband of the N first subbands, the amplitude quantization value of each first subband is one of the K amplitude quantization values, and K is an integer greater than 0.

In an optional embodiment, the first amplitude information is specifically used to indicate the amplitude quantization value of the wideband, the second amplitude information is specifically further used to indicate a first direction for adjusting the amplitude quantization values of the N first subbands of the precoding matrix, the first direction is an upward adjustment direction or a downward adjustment direction, the upward adjustment direction represents that the amplitude quantization values of the N first subbands are the amplitude quantization value of the wideband plus variations, and the downward adjustment direction represents that the amplitude quantization values of the N first subbands are the amplitude quantization value of the wideband minus variations.

In an optional embodiment, the first amplitude information is specifically used to indicate the amplitude quantization value of the wideband and a candidate amplitude quantization value set of the N first subbands that corresponds to the amplitude quantization value of the wideband, and the second amplitude information is specifically further used to indicate amplitude quantization values of the N first subbands in the candidate amplitude quantization value set.

In an optional embodiment, the determining module 530 is specifically configured to: determine amplitude information of the wideband based on the first amplitude information; determine amplitude information of the N first subbands based on the amplitude information of the wideband and the second amplitude information; and determine a precoding matrix based on the amplitude information of the N first subbands.

In an optional embodiment, the first amplitude information is one of L pieces of amplitude quantization information corresponding to the precoding matrix, the amplitude quantization information of each first subband of the N first subbands is one of P pieces of amplitude quantization information corresponding to the precoding matrix, L and P are integers greater than or equal to 0, and L is greater than P.

In an optional embodiment, the sending module 510 is further configured to send phase information of the precoding matrix to the terminal device, where the phase information is used to indicate phase quantization information of M second subbands of the wideband, and a quantity of resource blocks included in the N first subbands is greater than a quantity of resource blocks included in the M second subbands.

In an optional embodiment, the sending module 510 is further configured to: before the first amplitude information and the second amplitude information of the precoding matrix that are sent by the terminal device are received, send first instruction information to the terminal device, where the first instruction information is used to instruct the apparatus 500 to feed back the first amplitude information and the second amplitude information; and the receiving module 520 is specifically configured to receive the first amplitude information and the second amplitude information that are sent by the terminal device according to the first instruction information.

Figure 6:
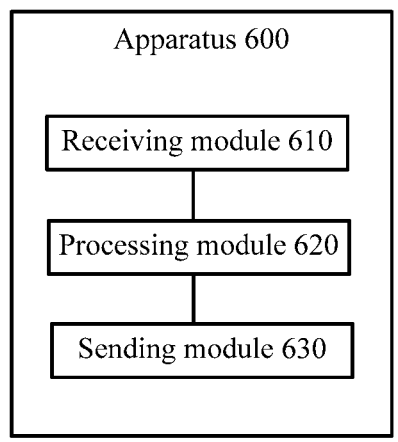
FIG. 6 is a schematic block diagram of still another apparatus for transmitting channel state information according to an embodiment of the present invention.

FIG. 6 is a schematic diagram of an apparatus 600 for transmitting channel state information according to an embodiment of the present invention. The apparatus may be, for example, the terminal device in the method 300. The apparatus 600 includes:

a receiving module 610, configured to receive a reference signal sent by a network device;

a processing module 620, configured to obtain a precoding matrix based on the reference signal; and a sending module 630, configured to send amplitude information of the precoding matrix to the network device, where the amplitude information is used to indicate amplitude quantization information of N first subbands of a wideband, where the sending module 630 is further configured to send phase information of the precoding matrix to the network device, where the phase information is used to indicate phase quantization information of M second subbands of the wideband, and a quantity of resource blocks included in each first subband of the N first subbands is greater than a quantity of resource blocks included in each second subband of the M second subbands.

Figure 7:
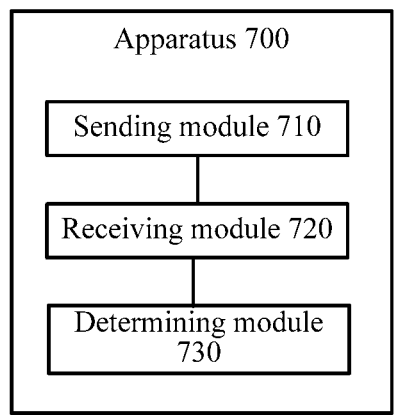
FIG. 7 is a schematic block diagram of still another apparatus for transmitting channel state information according to an embodiment of the present invention.

FIG. 7 is a schematic diagram of an apparatus 700 for transmitting channel state information according to an embodiment of the present invention. The apparatus may be, for example, the network device in the method 300. The apparatus 700 includes:

a sending module 710, configured to send a reference signal to a terminal device;

a receiving module 720, configured to receive amplitude information of a precoding matrix sent by the terminal device, where the amplitude information is used to indicate amplitude quantization information of N first subbands of a wideband, where the receiving module 720 is further configured to receive phase information of the precoding matrix sent by the terminal device, where the phase information is used to indicate phase quantization information of M second subbands of the wideband, and a quantity of resource blocks included in the N first subbands is greater than a quantity of resource blocks included in the M second subbands; and a determining module 730, configured to determine a precoding matrix based on the amplitude information of the precoding matrix and the phase information of the precoding matrix.

Figure 8:
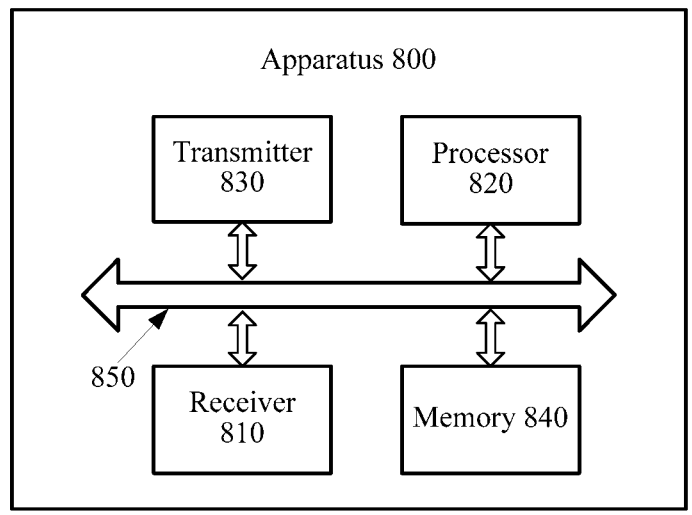
FIG. 8 is a schematic block diagram of still another apparatus for transmitting channel state information according to an embodiment of the present invention.

FIG. 8 shows an apparatus 800 for transmitting channel state information according to an embodiment of the present invention. For example, the apparatus 800 may be the terminal device in the method 200. The apparatus 800 includes a receiver 810, a processor 820, a transmitter 830, a memory 840, and a bus system 850. The receiver 810, the processor 820, the transmitter 830, and the memory 840 are connected by using the bus system 850. The memory 840 is configured to store an instruction. The processor 820 is configured to execute the instruction stored in the memory 840, to control the receiver 810 to receive a signal and control the transmitter 830 to send the instruction.

The receiver 810 is configured to receive a reference signal sent by a network device. The processor 820 is configured to: obtain a precoding matrix based on the reference signal, and determine first amplitude information and second amplitude information of the precoding matrix, where the first amplitude information is used to indicate amplitude quantization information of a wideband, and the second amplitude information is used to indicate amplitude quantization information of N first subbands of the wideband. The transmitter 830 is configured to send the first amplitude information and the second amplitude information to the network device.

It should be understood that the apparatus 800 may be specifically the terminal device in the method 200 in the foregoing embodiment, and may be configured to perform the steps and/or procedures corresponding to the terminal device. Optionally, the memory 840 may include a read-only memory and a random access memory, and provide the instruction and data for the processor. A part of the memory may further include a non-volatile random access memory. For example, the memory may further store information of a device type. The processor 820 may be configured to execute the instruction stored in the memory. When executing the instruction, the processor may perform the steps corresponding to the terminal device in the foregoing embodiment of the method 200.

Figure 9:
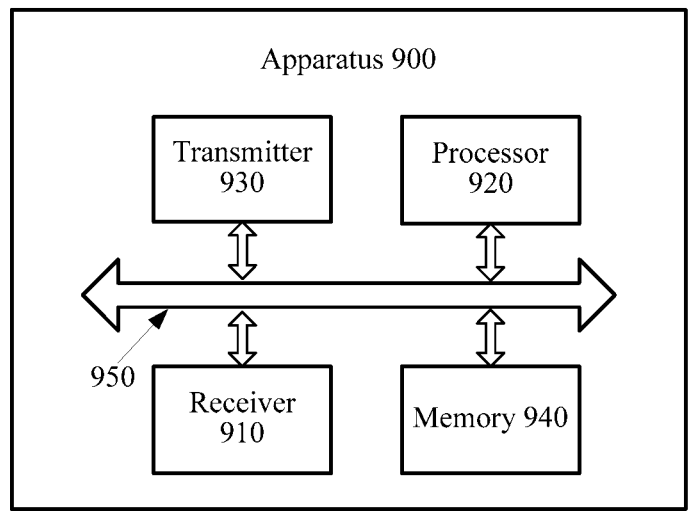
FIG. 9 is a schematic block diagram of still another apparatus for transmitting channel state information according to an embodiment of the present invention.

FIG. 9 shows an apparatus 900 for transmitting channel state information according to an embodiment of the present invention. For example, the apparatus 900 may be the network device in the method 200. The apparatus 900 includes a receiver 910, a processor 920, a transmitter 930, a memory 940, and a bus system 950. The receiver 910, the processor 920, the transmitter 930, and the memory 940 are connected by using the bus system 950. The memory 940 is configured to store an instruction. The processor 920 is configured to execute the instruction stored in the memory 940, to control the receiver 910 to receive a signal and control the transmitter 930 to send the instruction.

The transmitter 930 is configured to send a reference signal to a terminal device, so that the terminal device obtains a precoding matrix based on the reference signal. The receiver 910 is configured to receive first amplitude information and second amplitude information of the precoding matrix that are sent by the terminal device, where the first amplitude information is used to indicate amplitude quantization information of a wideband, and the second amplitude information is used to indicate amplitude quantization information of N first subbands of the wideband. The processor 920 is configured to determine a precoding matrix based on the first amplitude information and the second amplitude information.

It should be understood that the apparatus 900 may be specifically the network device in the method 200 in the foregoing embodiment, and may be configured to perform the steps and/or procedures corresponding to the network device. Optionally, the memory 940 may include a read-only memory and a random access memory, and provide the instruction and data for the processor. A part of the memory may further include a non-volatile random access memory. For example, the memory may further store information of a device type. The processor 920 may be configured to execute the instruction stored in the memory. When executing the instruction, the processor may perform the steps corresponding to the network device in the foregoing embodiment of the method 200.

Figure 10:
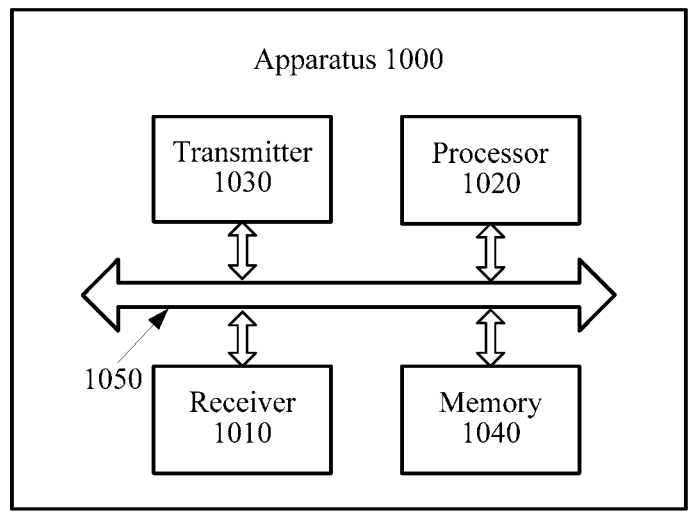
FIG. 10 is a schematic block diagram of still another apparatus for transmitting channel state information according to an embodiment of the present invention.

FIG. 10 shows an apparatus 1000 for transmitting channel state information according to an embodiment of the present invention. For example, the apparatus 1000 may be the terminal device in the method 300. The apparatus 1000 includes a receiver 1010, a processor 1020, a transmitter 1030, a memory 1040, and a bus system 1050. The receiver 1010, the processor 1020, the transmitter 1030, and the memory 1040 are connected by using the bus system 1050. The memory 1040 is configured to store an instruction. The processor 1020 is configured to execute the instruction stored in the memory 940, to control the receiver 1010 to receive a signal and control the transmitter 1030 to send the instruction.

The receiver 1010 is configured to receive a reference signal sent by a network device. The processor 1020 is configured to: obtain a precoding matrix based on the reference signal, and determine amplitude information of the precoding matrix. The transmitter 1030 is configured to send the amplitude information of the precoding matrix to the network device, where the amplitude information is used to indicate amplitude quantization information of N first subbands of a wideband. The transmitter 1030 is further configured to send phase information of the precoding matrix to the network device, where the phase information is used to indicate phase quantization information of M second subbands of the wideband, and a quantity of resource blocks included in each first subband of the N first subbands is greater than a quantity of resource blocks included in each second subband of the M second subbands.

It should be understood that the apparatus 1000 may be specifically the terminal device in the method 300 in the foregoing embodiment, and may be configured to perform the steps and/or procedures corresponding to the terminal device. Optionally, the memory 1040 may include a read-only memory and a random access memory, and provide the instruction and data for the processor. A part of the memory may further include a non-volatile random access memory. For example, the memory may further store information of a device type. The processor 1020 may be configured to execute the instruction stored in the memory. When executing the instruction, the processor may perform the steps corresponding to the terminal device in the foregoing embodiment of the method 300.

Figure 11:
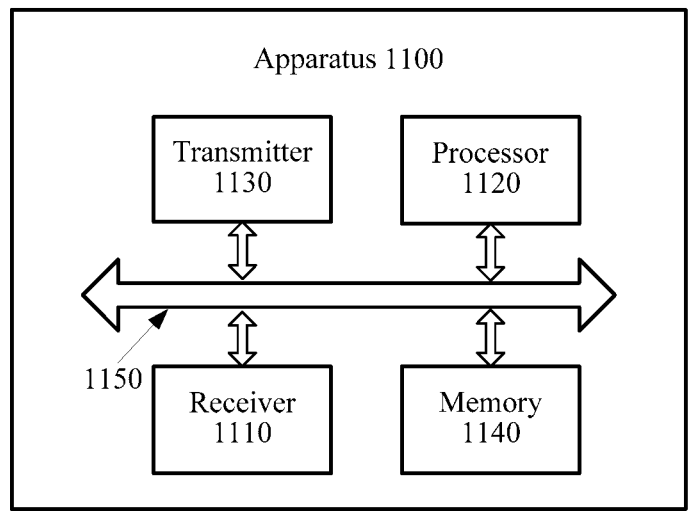
FIG. 11 is a schematic block diagram of still another apparatus for transmitting channel state information according to an embodiment of the present invention.

FIG. 11 shows an apparatus 1100 for transmitting channel state information according to an embodiment of the present invention. For example, the apparatus 1100 may be the network device in the method 300. The apparatus 1100 includes a receiver 1110, a processor 1120, a transmitter 1130, a memory 1140, and a bus system 1150. The receiver 1110, the processor 1120, the transmitter 1130, and the memory 1140 are connected by using the bus system 1150. The memory 1140 is configured to store an instruction, and the processor 1120 is configured to execute the instruction stored in the memory 1140, to control the receiver 1110 to receive a signal and control the transmitter 1130 to send the instruction.

The transmitter 1130 is configured to send a reference signal to a terminal device. The receiver 1110 is configured to: receive amplitude information of a precoding matrix sent by the terminal device, where the amplitude information is used to indicate amplitude quantization information of N first subbands of a wideband, and receive phase information of the precoding matrix sent by the terminal device, where the phase information is used to indicate phase quantization information of M second subbands of the wideband, and a quantity of resource blocks included in the N first subbands is greater than a quantity of resource blocks included in the M second subbands. The processor 1120 is configured to determine a precoding matrix based on the amplitude information of the precoding matrix and the phase information of the precoding matrix.

It should be understood that the apparatus 1100 may be specifically the network device in the method 300 in the foregoing embodiment, and may be configured to perform the steps and/or procedures corresponding to the network device. Optionally, the memory 1140 may include a read-only memory and a random access memory, and provide the instruction and data for the processor. A part of the memory may further include a non-volatile random access memory. For example, the memory may further store information of a device type. The processor 1120 may be configured to execute the instruction stored in the memory. When executing the instruction, the processor may perform the steps corresponding to the network device in the foregoing embodiment of the method 300.

It should be understood that in the embodiments of the present invention, the processor 820, the processor 920, the processor 1020, or the processor 1120 may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor, or the like.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for transmitting channel state information in a wireless communication system, comprising:
    receiving, by a terminal device, a reference signal from a network device;
    obtaining, by the terminal device, a precoding matrix based on the reference signal;
    determining, by the terminal device, first amplitude information and second amplitude information of the precoding matrix, wherein the first amplitude information is used to indicate amplitude quantization information of a wideband, the second amplitude information is used to indicate amplitude quantization information of N subbands of the wideband, and N is an integer greater than 0; and
    sending, by the terminal device, the first amplitude information and the second amplitude information to the network device.

2. The method according to claim 1, wherein the amplitude quantization information of the wideband is an amplitude quantization value of the wideband, and the amplitude quantization information of the N subbands is information about variations of amplitude quantization values of the N subbands relative to the amplitude quantization value of the wideband.

3. The method according to claim 1, wherein the first amplitude information is one of L pieces of amplitude quantization information corresponding to the precoding matrix, the amplitude quantization information of each subband of the N subbands is one of P pieces of amplitude quantization information corresponding to the precoding matrix, L and P are integers and L is greater than P.

4. The method according to claim 1, wherein before the sending, by the terminal device, the first amplitude information and the second amplitude information to the network device, the method further comprises:
    receiving, by the terminal device, instruction information from the network device, wherein the instruction information is used to instruct the terminal device to feed back the first amplitude information and the second amplitude information.

5. A method for transmitting channel state information in a wireless communication system, comprising:
    sending, by a network device, a reference signal to a terminal device;
    receiving, by the network device, first amplitude information and second amplitude information of a precoding matrix from the terminal device, wherein the first amplitude information is used to indicate amplitude quantization information of a wideband, the second amplitude information is used to indicate amplitude quantization information of N subbands of the wideband, and N is an integer greater than 0; and
    determining, by the network device, the precoding matrix based on the first amplitude information and the second amplitude information.

6. The method according to claim 5, wherein the amplitude quantization information of the wideband is an amplitude quantization value of the wideband, and the amplitude quantization information of the N subbands is information about variations of amplitude quantization values of the N subbands relative to the amplitude quantization value of the wideband.

7. The method according to claim 5, wherein the first amplitude information is one of L pieces of amplitude quantization information corresponding to the precoding matrix, the amplitude quantization information of each subband of the N subbands is one of P pieces of amplitude quantization information corresponding to the precoding matrix, L and P are integers and L is greater than P.

8. The method according to claim 5, further comprising:
    sending, by the network device, instruction information to the terminal device, wherein the instruction information is used to instruct the terminal device to feed back the first amplitude information and the second amplitude information.

9. A terminal device, comprising:
    a receiver, configured to receive a reference signal from a network device;
    a processor, coupled to the receiver and configured to:
    obtain a precoding matrix based on the reference signal; and determine first amplitude information and second amplitude information of the precoding matrix, wherein the first amplitude information is used to indicate amplitude quantization information of a wideband, the second amplitude information is used to indicate amplitude quantization information of N subbands of the wideband, and N is an integer greater than 0; and a transmitter, configured to transmit the first amplitude information and the second amplitude information to the network device.

10. The terminal device according to claim 9, wherein the amplitude quantization information of the wideband is an amplitude quantization value of the wideband, and the amplitude quantization information of the N subbands is information about variations of amplitude quantization values of the N subbands relative to the amplitude quantization value of the wideband.

11. The terminal device according to claim 9, wherein the first amplitude information is one of L pieces of amplitude quantization information corresponding to the precoding matrix, the amplitude quantization information of each subband of the N subbands is one of P pieces of amplitude quantization information corresponding to the precoding matrix, L and P are integers and L is greater than P.

12. The terminal device according to claim 9, wherein the receiver is further configured to receive instruction information from the network device, wherein the instruction information is used to instruct the terminal device to feed back the first amplitude information and the second amplitude information.

13. A network device, comprising:

a transmitter, configured to transmit a reference signal to a terminal device;

a receiver, configured to receive first amplitude information and second amplitude information of a precoding matrix from the terminal device, wherein the first amplitude information is used to indicate amplitude quantization information of a wideband, the second amplitude information is used to indicate amplitude quantization information of N subbands of the wideband, and N is an integer greater than 0; and a processor, coupled to the receiver and the transmitter and configured to determine the precoding matrix based on the first amplitude information and the second amplitude information.

14. The network device according to claim 13, wherein the amplitude quantization information of the wideband is an amplitude quantization value of the wideband, and the second amplitude information is amplitude quantization information of the N subbands is information about variations of amplitude quantization values of the N subbands relative to the amplitude quantization value of the wideband.

15. The network device according to claim 13, wherein the first amplitude information is one of L pieces of amplitude quantization information corresponding to the precoding matrix, the amplitude quantization information of each subband of the N subbands is one of P pieces of amplitude quantization information corresponding to the precoding matrix, L and P are integers and L is greater than P.

16. The network device according to claim 13, wherein the transmitter is configured to transmit instruction information to the terminal device, wherein the instruction information is used to instruct the terminal device to feed back the first amplitude information and the second amplitude information.

\* \* \* \* \*